United States Patent [19]

Hauschopp

[11] Patent Number: 5,486,076
[45] Date of Patent: Jan. 23, 1996

[54] RADIUS-MILLING FIXTURE FOR MACHINING WORKPIECES

[76] Inventor: Bernhard Hauschopp, Franz-Simon-Strasse 19, D-65934 Frankfurt (Main), Germany

[21] Appl. No.: 290,795

[22] PCT Filed: Feb. 3, 1993

[86] PCT No.: PCT/DE93/00087

§ 371 Date: Aug. 10, 1994

§ 102(e) Date: Aug. 10, 1994

[87] PCT Pub. No.: WO93/15873

PCT Pub. Date: Aug. 19, 1993

[30] Foreign Application Priority Data

Feb. 8, 1992 [DE] Germany .......................... 42 03 721.2

[51] Int. Cl.⁶ .................................. B23C 1/20; B27C 5/10
[52] U.S. Cl. .......................... 409/179; 33/27.03; 144/24; 144/134 D; 144/136 C
[58] Field of Search ...................................... 409/178, 179, 409/180, 182; 144/371, 24, 134 D, 136 C; 33/27.031, 27.03

[56] References Cited

U.S. PATENT DOCUMENTS

| | | | |
|---|---|---|---|
| D. 337,501 | 7/1993 | Witt | D8/70 |
| 2,658,278 | 11/1953 | Debs | 33/22.03 X |
| 3,177,586 | 4/1965 | Arno | 33/22.03 X |
| 3,292,494 | 12/1966 | Anderson . | |
| 3,635,268 | 1/1972 | Lange | 144/134 D |
| 4,044,805 | 8/1977 | Gronholz . | |
| 4,267,638 | 5/1981 | Heinz | 33/22.03 |
| 4,777,991 | 10/1988 | Adame . | |
| 4,798,506 | 1/1989 | Kulp, Jr. . | |

FOREIGN PATENT DOCUMENTS

| | | |
|---|---|---|
| 3223561 | 12/1983 | Germany . |
| 803158.6 | 8/1988 | Germany . |
| 3844653 | 4/1990 | Germany . |
| 3917812 | 12/1990 | Germany . |

Primary Examiner—William Briggs
Attorney, Agent, or Firm—Koda and Androlia

[57] ABSTRACT

The invention concerns a radius-milling fixture for machining workpieces by means of a hand-held router. The fixture has a rectangular support (1), made preferably of plexiglas, which has a support surface designed to accommodate the hand-held router. The support (1) has a slot in which a fastening device (31, 32) can slide. The fastening device (31, 32) is fitted with a bolt which can be inserted in a bore in the workpiece (40) to be machined. Tightening the fastening device locks the bolt in place relative to the support (1).

13 Claims, 4 Drawing Sheets

RADIUS-MILLING FIXTURE FOR MACHINING WORKPIECES

DESCRIPTION

The invention concerns a radius-milling fixture.

Semicircular doors or other articles with circular-shaped cutouts or edges need to be fabricated as precisely and inexpensively as possible. For medium-sized carpentry shops, the use of computer-controlled machine tools which allow a precise manufacture is generally ruled out for cost reasons. Furthermore, such machines can only be used in the workshop. Because of their heavy weight, they cannot be used on site.

An often-employed technique of making circular cutouts, for example in particle board, consists in striking a circle on a particle board with a compass and then cutting out the board along the periphery of the circle with a hand saw. However, this technique has the shortcoming that the cutout parts need to be finished by means of an edge grinder in order to smooth the edges. Even so, many edges still remain unclean.

Meanwhile, there is also a known device for machining of corner regions of boards, in which a holder and a carrier arm swiveling on the holder are provided (DE-A-32 23 561). At one end of the carrier arm there is provided a plate to accommodate a height-adjustable manual surface milling cutter. The carrier arm can swivel about an axis, but not itself shift relative to this axis. For this shifting, a special guide rail with a holder arm is required, being connected to the swiveling part of the carrier arm. The entire device is very complicated and bulky, as it consists of many parts that are arranged at angles with respect to each other. This device is not suitable for everyday use in a carpentry shop.

Furthermore, there is a known method of producing rounded sheetlike wood parts, in which grooves are made by using a freely guided surface milling cutter with an end mill and a depth stop (DE-A-38 44 653). The surface milling cutter has a bottom piece with two boreholes, through which guide rods are pushed. By shifting the surface milling cutter on these rails, it is possible to cut grooves into a workpiece at variable distances from a reference point.

Another familiar radius cutting device has a manual surface milling cutter, a central fixation, and a milling guide (DE-GM 88 03 158). The central fixation has a fastening part that can be fixed to a circular disc being cut and a driver that can rotate with respect to this fastening part, on which the milling guide is mounted. Similar to the milling method described above, the fastening part consists of two parallel guide rods. The drawback in this familiar device is that it is relatively cumbersome, since the parallel guide rods must be connected to a special driver, which is fashioned as a circular disc and has a trunnion mounting.

Furthermore, there is a known unit for guiding a router, by which the router can be precisely used in order to fit the edges of a sheet of veneer to the edges of the wood layer underneath (U.S. Pat. No. 4,044,805). However, this device is relatively complicated, so that it cannot be produced cost-effectively.

Finally, there is another known carrier device with a bearing surface to accommodate a milling cutter, having a slot in which a fastening fixture is moved (U.S. Pat. No. 4,798,506). The bearing surface is connected to another part, constituting an elongation, with which the workpiece can be connected. However, the bearing surface cannot be used by itself. Furthermore, it is not possible to cut out grooves with very small radii.

The purpose of the invention is to create a radius-milling fixture that can be made cost-effectively and is easy to use.

This purpose is accomplished by the features of Patent claim 1.

The advantage to be achieved by the invention consists especially in that all common manual surface milling cutters can be used. All that need be done is to provide a carrier plate with boreholes that correspond to the fastening elements of the particular manual surface milling cutters. Furthermore, grooves with very small radii can be cut, since the pivot point of the fixture can be moved below the bearing surface of the milling cutter. In addition, grooves with very large radii can also be cut by applying an extension device.

A sample embodiment of the invention is shown in the drawing and shall be described more closely below:

Figure 1:
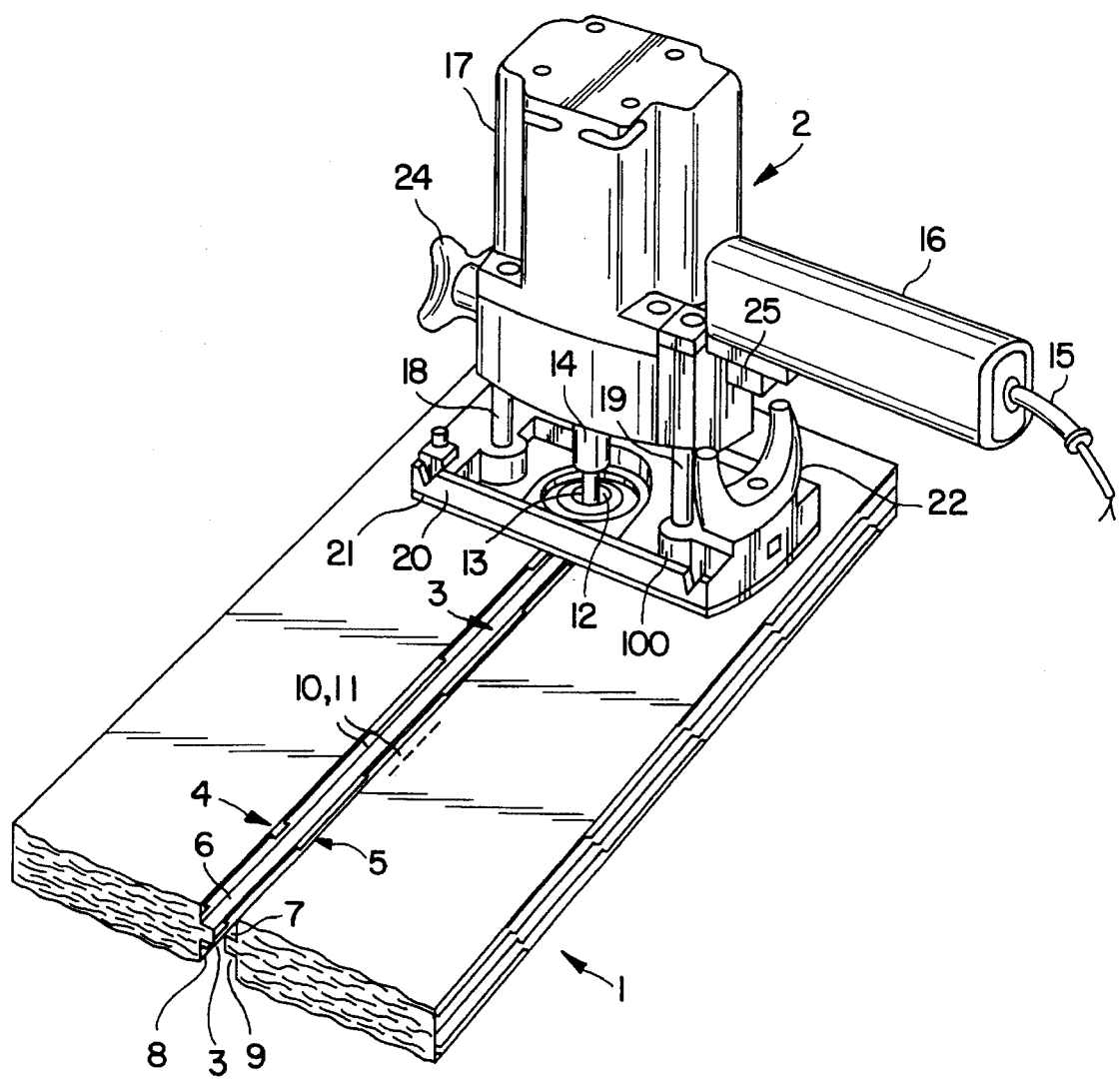
FIG. 1 shows a manual surface milling cutter with a template according to the invention, in perspective view.

FIG. 1 depicts a template 1 according to the invention, made of plexiglas, with a manual surface milling cutter 2. This template 1 has a slot 3, which is framed in on either side by guideways 4, 5, which in turn have an upper countersinking 6, 7 and a lower countersinking 8, 9, so that a middle land 10, 11 is left. The slot 3 ends in a borehole 12, above which is located a screw thread 13 of the mortising machine 2 for the mounting of a milling head (not shown). The screw thread 13 represents the prolongation of a rotating cylinder 14, which is driven by an electric motor located in the mortising machine 2. This electric motor draws electricity across the cord 15, which is led through a handle 16 of the mortising machine 2 to the electric motor.

The housing 17 of the manual surface milling cutter 2 rests across two bolts 18, 19 on a metallic bottom plate 20, which in turn is connected to a fitting plate 21. The plates 20, 21 are fastened to the plexiglas template 1 by means of screws, not shown in FIG. 1. There is also a pillow block 22 provided on the plate 20, being spaced slightly from the housing 17 of the manual surface milling cutter 2. The milling cutter 2 is turned on by a switch 25, while the adjustment and the screwing of the milling head (not shown in FIG. 1) in and out is done by a turn wheel 24. The plexiglas template 1 is broken off at one end. However, the slot 3 terminates at the broken end in a borehole 12, similar to the depicted end.

Figure 2:
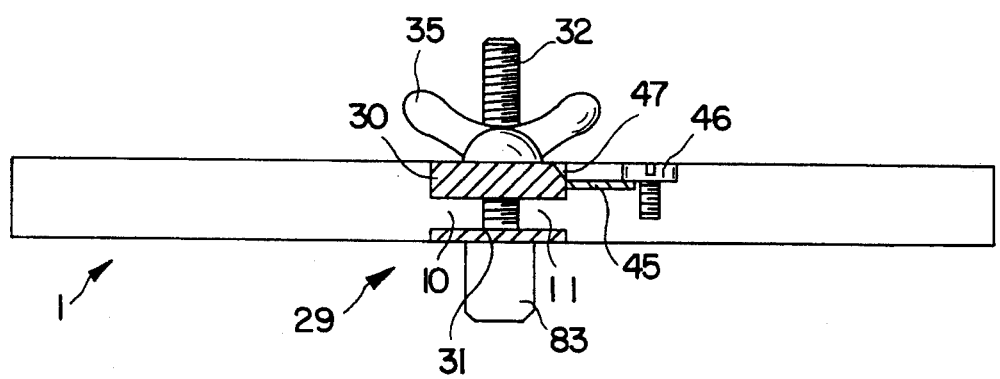
FIG. 2 shows a cross section through the template per FIG. 1 with a first fastening device.

FIG. 2 shows a cross section through the template 1, in which one recognizes a first fastening device 29 for fastening the template 1 to a workpiece. This fastening device 29 has a rectangular or square guide disc 30, which is guided on the upper countersinkings 6, 7 above the lands 10, 11 of the template 1. Beneath the lands 10, 11 is a round washer 31, abutting on a cylindrical piece 83 that is firmly joined to a screw 32. A fly nut 35 is screwed onto this screw 32. As an additional element, a scale or ruler 45 can be provided next to the guide disc 30, being held in place by a screw 46 drilled in the template 1 and moving parallel to the slot 3. The guide disc 30 can be provided with a notch 47, enabling a precise reading of the adjusted radius. Of course, the template 1 can be made of any other material besides plexiglas, e.g., plastic-molded particle board. However, plexiglas has the advantage that one can see the material being machined underneath or behind it.

Figure 3:
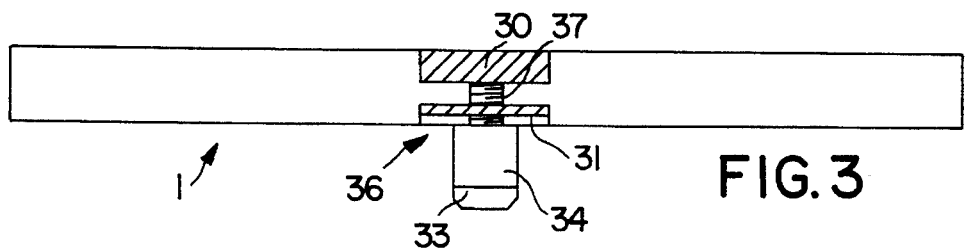
FIG. 3 shows a cross section through the template per FIG. 1 with a second fastening device.

FIG. 3 shows a variant of a fastening device. In this variant 36, there is no screw 32 protruding from the template 1, but instead the guide disc 30 merges smoothly with the surface of the template 1, and a screw 37 with a head 33 is screwed into this guide disc 30 from underneath. The variant of FIG. 3 is especially suited for the routing of arcs with very small radii, because the guide disc 30 can be pushed beneath the plates 20, 21 of the cutting machine 2, without the interference of a projecting screw.

The screw 32 with the fly nut 35, shown in FIG. 2, has the advantage in normal situations that the positioning can be done from the top; i.e., by tightening the fly nut 35, the two discs 30, 31 are pressed against the lands 10, 11, so that the screw 32 can no longer be moved along the slot 3. In the fastening device of FIG. 3, the locking must be done from underneath; i.e., the screw 37 with the head 33 is screwed into the guide disc 30 from the bottom.

The cylindrical piece 34 can turn freely about the screw 37, 32. This has the advantage that the piece 34 can be fastened in a borehole, without this hindering the rotary movement of the template 1.

Figure 4:
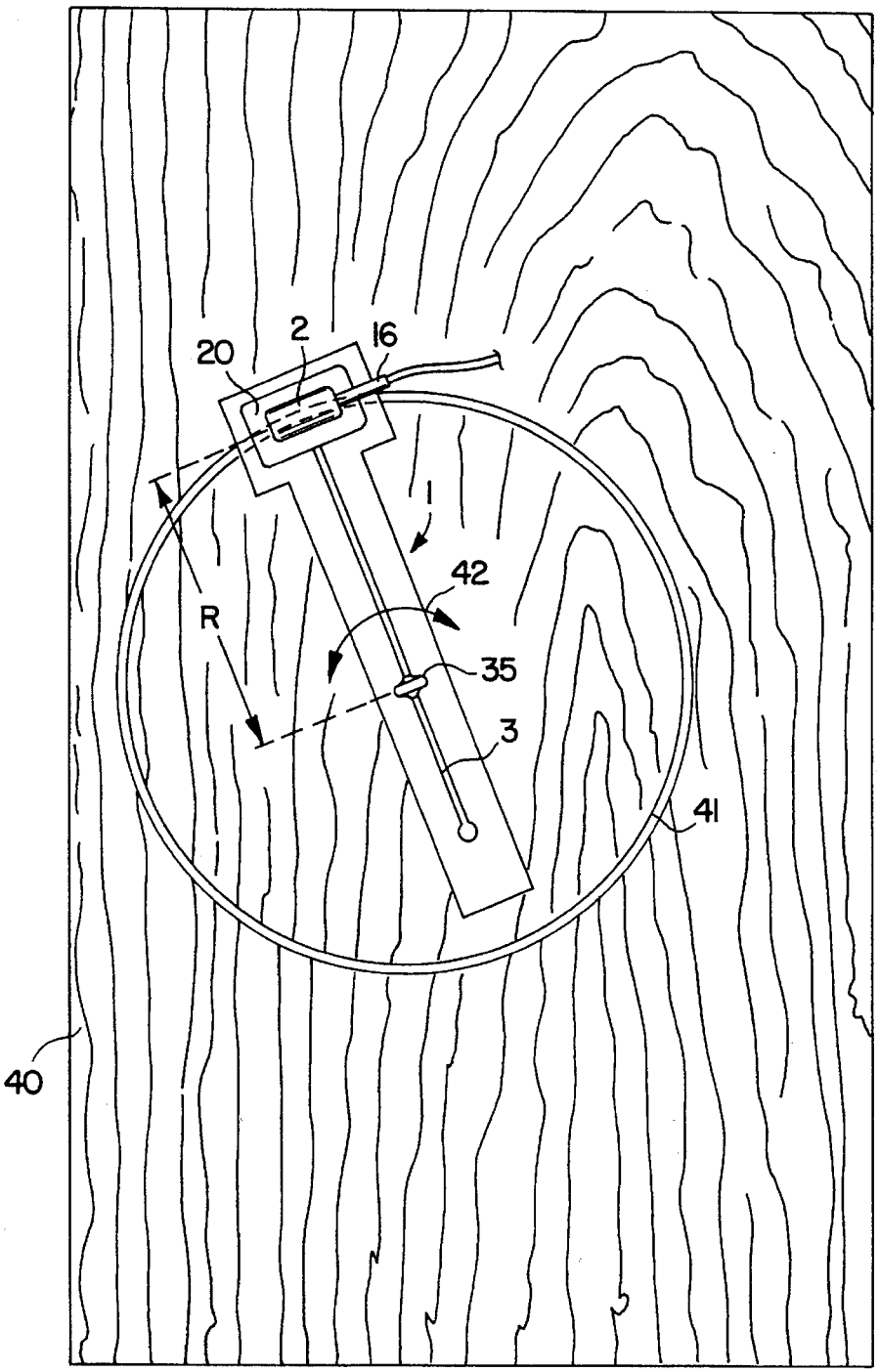
FIG. 4 shows a sheet of wood being cut out in a circular arc with a device per FIG. 1.

The method of operation of the invented device shall be described by means of FIG. 4.

First, a hole is drilled in a sheet of wood 40 being machined, having a diameter that basically corresponds to the diameter of the cylindrical piece 34. The cylindrical piece 34 with the screw head 33 is introduced into this hole. The hole represents the center point of a circle, on whose circumference the circular arc being cut is located. The radius of this circle is designated by R in FIG. 4. However, since the discs 30, 31 can move, the desired radius must be further locked. For this, either the fly nut 35 is tightened or the screw head 33 (FIG. 3) is tightly joined to the disc 30. If the radius R is determined, the template can be turned about the borehole in the wooden sheet 40, so that a circular or semicircular groove 41 can be cut out with the manual router.

Although the template 1 after being locked can no longer shift relative to the borehole in the wooden sheet 40, a twisting in the direction of the double arrow 42 is still possible. Highly accurate cutout of circular arcs is possible in this way. This turning motion is facilitated by the cylindrical piece 34, which embraces the screw 37 though not engaging with it. If this facilitation is not needed, the cylindrical piece 34 can also be eliminated. In this case, however, it is recommended that the lower part of the screw 32 not be threaded, but rather left smooth, so that the smooth piece can turn in the drilled piece. As tests have shown, a smooth piece is also suitable for clamping if its diameter is exactly matched to the diameter of the borehole. But if its diameter is much smaller, although no clamping will occur, the smooth piece will wobble in the overly large borehole, so that the circular arcs cut may not be sufficiently precise.

Figure 5:
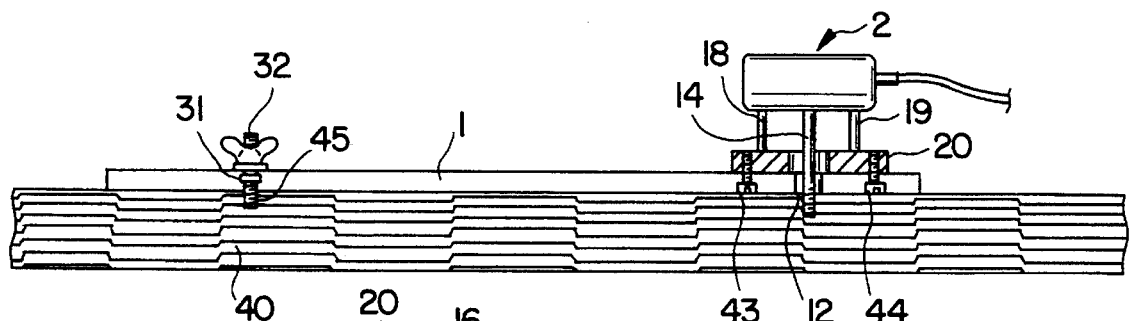
FIG. 5 shows a lateral section through a sheet of wood, arranged on a device per FIG. 1.

FIG. 5 shows a cross section through the wooden sheet 40, the plexiglas template 1, and the foot plates 20, 21, clearly revealing how the router 2 is connected to the template 1. There are four screws provided here, although only two screws 43, 44 can be recognized in FIG. 5.

In order to be able to use the template 1 with different milling machines having different base surfaces and fastening elements, boreholes are provided in the template 1, adjusted to the particular milling machines. Thus, there are templates with boreholes for milling machine A and templates with boreholes for milling machine B, etc. Such different boreholes can easily be made with preset drills.

However, it is also possible to furnish drilling templates with the template 1, indicating where the holes must be drilled for a particular milling machine. The buyer of a template 1 can then himself drill the necessary holes in the template 1 with a drill.

Figure 6:
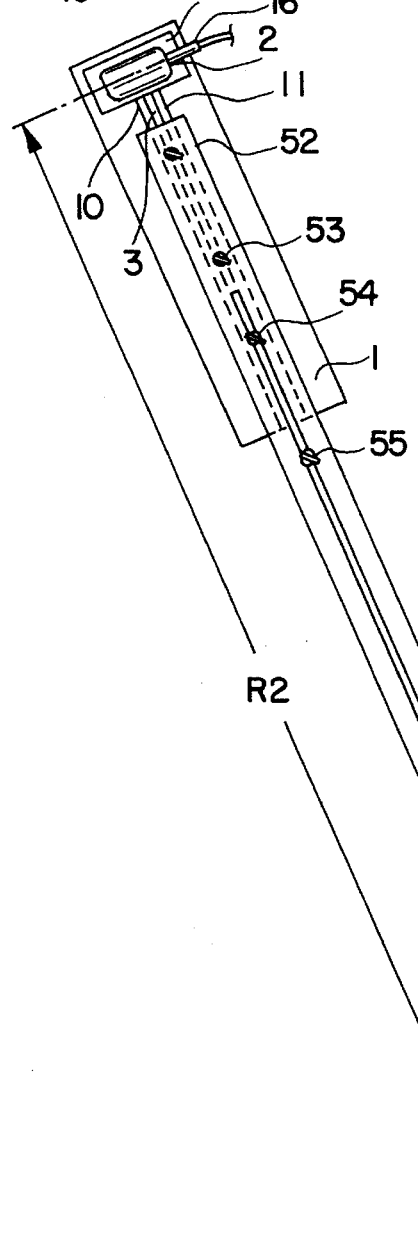
FIG. 6 shows a top view of a template per FIG. 1 with extension rail.

With the device depicted in FIGS. 1–5, one can easily make milling cuts with radius of around 2.5 cm to 65 cm. If larger radii must be cut, an extension rail can be flanged onto this device. Such an extension rail will be described below. FIG. 6 shows the plexiglas template 1 with the manual cutting machine 2 and the plate 20, the template 1 being connected to an extension rail 50. The extension rail 50 consists, for example, of aluminum and has a lengthwise slot 51 in its middle. Several screw threads are inserted through this lengthwise slot 51, being connected with fly nuts 52–55. The purpose of the extension rail is to cut out circular grooves with very large radius. In order to accomplish this, for example, a template whose end is provided with a fly nut 56 is screwed into the wood being worked. The radius R2 of the groove to be cut corresponds in this case to the distance between the fly nut 56 and the milling head of the manual cutting machine 2. With the fly nuts 52–55, the extension rail 50 is locked onto the template 1 or a metal strip (not seen in FIG. 6) is locked.

Figure 7:
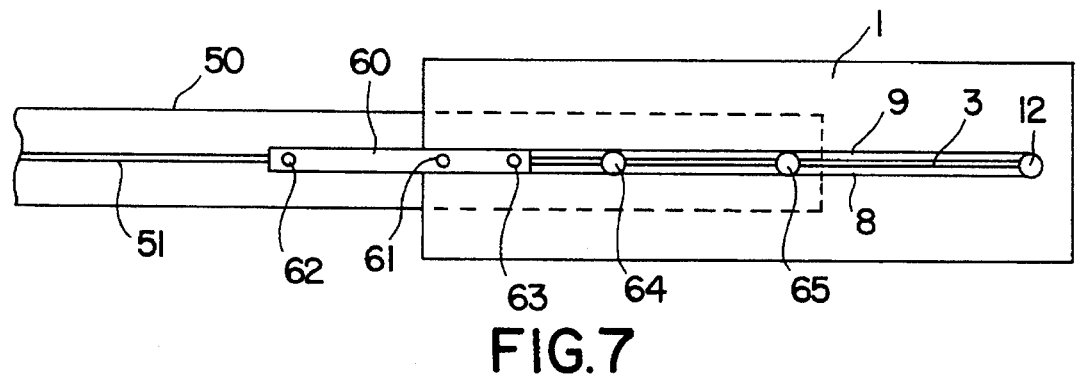
FIG. 7 shows a bottom view of one end of the device per FIG. 6.

This metal strip 60 can be seen in FIG. 7. It is provided with a bolt 61 and one can see the ends 62, 63 of the thumb screws 54, 55. Metal discs are indicated by 64, 65. These can be connected to the thumb screws 52, 53 and moved through the grooves 8, 9 (cf. FIG. 1).

Figure 8:
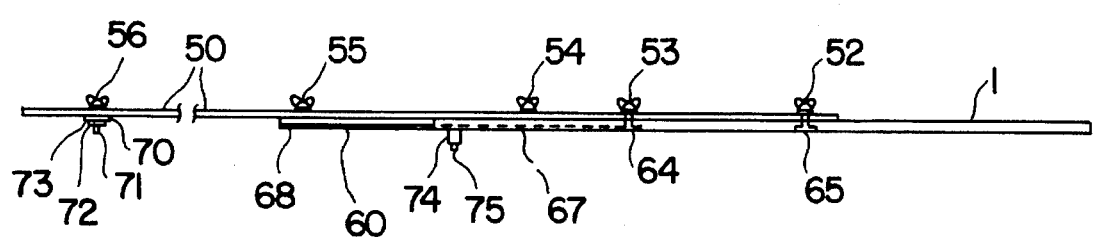
FIG. 8 shows a side view of the device depicted in FIG. 7.

FIG. 8 shows the device of FIG. 7 in a side view. One recognizes the metal discs 64, 65, which are connected to the fly nuts 52, 53 and placed in the groove of the template 1. The fly nut 54 is connected to a screw 67, which is connected to the metal strip 60. A further connection to the metal strip 60 is produced by a screw, joined to the fly nut 55, which is inserted through a spacer 68. Another spacer 70 is provided on the underside of the extension rail 50. A screw that is connected to the fly nut 56 is inserted through this spacer 70, whose height corresponds to the thickness of the template 1. The end of the screw is designated by 71, while 72 designates a sleeve that surrounds the screw. A washer 73 is located between sleeve 72 and disc 70. The structural elements 72, 71 correspond to the structural elements 74, 75.

Figure 9:
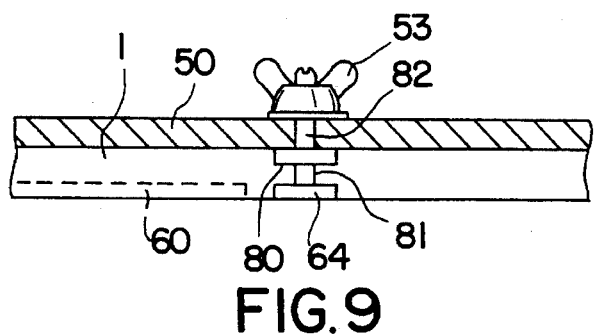
FIG. 9 shows an enlarged picture of a middle region of the template, connected to an extension rail.

FIG. 9 shows a segment of FIG. 8 in enlarged scale. One recognizes the metal strip 60, placed in the central groove of the template. In this same groove is placed the metal disc 64, which is connected to the screw 82. On the underside of the extension rail 50 and around the borehole, through which the screw 82 emerges, a rectangular or square piece is welded or screwed on, fitted into the upper groove of the template 1.

The mode of operation of the extension device depicted in FIGS. 6–8 is described below.

If it is necessary to produce a circular cutout with a radius R2 that is larger than the length of the template 1, the template 1 is no longer sufficient. However, it can be coupled with the extension rail 50. For this, the groove already present in the template 1 is used to produce the connection between template 1 and extension rail 50.

Basically, this is achieved in that the metal plates or discs 64, 65, which are joined to the extension rail 50 by screws, are moved in the grooves 8, 9. Furthermore, the metal sheet 60, which produces the connection between extension rail 50 and template 1 at the transition between the latter, is inserted into the grooves 8, 9. Furthermore, the spacer 68 enables a straight guidance of the metal strip 60.

Thus, when the radius needs to be increased, the extension rail 50 is placed in the middle on the top side of the template 1. Now, a screw that is provided with a meal disc 65 at one end is inserted from the bottom through the slot 3 of the template 1 and through a borehole of the extension rail 50. On the other side of the template 1, the fly nut 52 is now screwed onto the screw. In this way, the screw and the metal disc 65 form a fixed point. Thanks to the rectangular of square piece guided in the groove, the rail 50 is now already fixed relative to the template 1, i.e., it can no longer turn relative to it. For further fixation, a fastener is provided at a second location, being formed by a second screw, which is firmly connected to the metal disc 64 at one end. This second fixed point is formed by a second screw, which is firmly connected to the metal disc 64 at one end. This screw is inserted through the slot 3 of the template 1 and through a borehole in the extension rail 50 and then fastened by means of the fly nut 53. The extension rail 50 is now firmly connected to the template 1.

The midpoint of the radius that determines the circle or circular arc to be cut out is determined by the screw 71 that is inserted through a borehole of the workpiece and through the slot 51 of the extension rail 50 and subsequently fastened with the fly nut 56. The spacer 70, which is as thick as the template 1, enables a straight guidance of the extension rail 50. The ring 72 is removed before assembly, since it has no function here.

The metal strip 60, the spacer 68, and the screws 67, 68, joined to the fly nuts 54, 55, are used to select a milling radius, lying in the transitional region between template 1 and extension rail 50.

The template 1 can be used to make cutouts whose radii are determined by the slot 3. As can be seen in FIG. 4, this slot 3 cannot be drawn over the entire length of the template 1, for otherwise the template would be split and become unstable. Radii which lie between the end of the template 1 and the end of the slot 3 therefore cannot be cut out with the template 1. If the extension rail 50 is coupled to the template in the manner described above, again these radii cannot be cut out, since there is no room available for the arrangement of screws in said region. This defect is eliminated with the metal strip 60, which can be moved in parallel to the arrangement of the extension rail 50/template 1 with the fly nuts 55, 54 loosened and locked in any desired position. Since a bolt 75 is arranged on this metal strip 60, which can be inserted through a borehole in the workpiece and fastened on the other side with a fly nut, the arrangement of the extension rail 50 and template 1 can swivel about the pivot point formed by the bolt 75. The individual bolt 75 can be fashioned as the device 33, 34 indicated in FIGS. 2 and 3.

I claim:

1. Radius-milling fixture for machining of workpieces by means of a manual surface milling cutter, with a plate (1), which has a slot (3), a fastening device (30–35), which can be guided in the slot (3) and connected to the workpiece (40) being machined, an upper guide groove (6, 7) provided in the upper region of the slot (3), a bottom plate (20, 21) for the manual surface milling cutter, characterized in that;

the plate (1) serves as a bearing surface for the bottom plate (20, 21) of the manual surface milling cutter, a lower guide groove is provided in the lower region of the slot (3), a borehole is provided in the plate (1), through which the milling head of the manual surface milling cutter can be guided, the slot (3) with the upper and lower guide grooves (6, 7, 8, 9) terminates in the borehole (12), and the fastening device (30–35) has a projection (33, 34) that projects past the bottom side of the plate (1).

2. Radius-milling fixture per claim 1, characterized in that the upper and lower guide grooves (6, 7, 8, 9) are formed by countersinkings in the plate (1) and their width is larger than the width of the slot (3).

3. Radius-milling fixture for machining of workpieces by means of a manual surface milling cutter, with a plate (1), a slot (3) provided in said plate (1), a fastening device (30–35), which can be guided in the slot (3) and connected to the workpiece (40) being machined, an upper guide groove (6, 7) provided in the upper region of the slot (3), a bottom plate (20, 21) for the manual surface milling cutter, characterized in that;

the plate (1) serves as a bearing surface for the bottom plate (20, 21) of the manual surface milling cutter, a lower guide groove (8, 9) is provided in the lower region of the slot (3), a borehole (12) is provided in the plate (1), through which the milling head of the manual surface milling cutter can be guided, the slot (3) with the upper and lower guide grooves (6, 7, 8, 9) terminates in the borehole (12), the fastening device (30–35) has a projection (33, 34) that projects past the bottom side of the plate (1), and the projection has a screw threading (37), which is provided with a head (33) at one end, whose outer diameter is larger than the inner diameter of a sleeve (34), which embraces at least part of the screw threading (37).

4. Radius-milling fixture per claim 1, characterized in that a guide plate (30) is provided in the upper guide groove (6, 7), being connected to a bolt (37), and its surface is flush with the surface of the plate.

5. Radius-milling fixture per claim 1, characterized in that the plate 1 has boreholes, through which connection elements can be inserted, joining the plate (1) to an extension rail (50).

6. Radius-milling fixture per claim 5, characterized in that the connection elements are screws, which have a plate (64, 65) at one end, whose diameter corresponds to the diameter of the lower guide groove (8, 9) and whose other end is provided with a screw nut (52, 53).

7. Radius-milling fixture for machining of workpieces by means of a manual surface milling cutter, with a plate (1)

a slot (3) provided in said plate (1), a fastening device (30–35), which can be guided in the slot (3) and connected to the workpiece (40) being machined, an upper guide groove (6, 7) provided in the upper region of the slot (3), a bottom plate (20, 21) for the manual surface milling cutter, characterized in that;

the plate (1) serves as a bearing surface for the bottom plate (20, 21) of the manual surface milling cutter, a lower guide groove (8, 9) is provided in the lower region of the slot (3), a borehole (12) is provided in the plate (), through which the milling head of the manual surface milling cutter can be guided, the slot (3) with the upper and lower guide grooves (6, 7, 8, 9) terminates in the borehole (12), the fastening device (30–35) has a projection (33, 34) that projects past the bottom side of the plate (1), the plate (1) has boreholes, through which connection elements can be inserted, joining the plate (1) to an extension rail (50), and the extension rail (50) has a central slot (51), which is a continuation of the slot (3) of the plate (1).

8. Radius-milling fixture per claim 5, characterized in that a rail (60) is provided with a connection element (75) for connection to a workpiece (40), the width of the rail (60) corresponding to the width of the lower guide groove (8, 9), and this rail (60) has bolts that can be inserted through the slot (3) of the plate (1) and a slot (51) of the extension rail (50) or only through the slot (51) of the extension rail (50) and locked to the latter.

9. Radius-milling fixture per claim 8, characterized in that the bolts are screw threads and locking is achieved by means of screw nuts (54, 55).

10. Radius-milling fixture for machining of workpieces by means of a manual surface milling cutter, with a plate (1), a slot (3) provided in said plate (1), a fastening device (30–35), which can be guided in the slot (3) and connected to the workpiece (40) being machined, an upper guide groove (6, 7) provided in the upper region of the slot (3), a bottom plate (20, 21) for the manual surface milling cutter, characterized in that:

the plate (1) serves as a bearing surface for the bottom plate (20, 21) of the manual surface milling cutter, a lower guide groove (8, 9) is provided in the lower region of the slot (3), a borehole (12) is provided in the plate (1), through which the milling head of the manual surface milling cutter can be guided, the slot (3) with the upper and lower guide grooves (6, 7, 8, 9) terminates in the borehole (12), the fastening device (30–35) has a projection (33, 34) that projects past the bottom side of the plate (1), the plate (1) has boreholes, through which connection elements can be inserted, joining the plate (1) to an extension rail (50), a rail (60) is provided with a connection element (75) for connection to a workpiece (40), the width of the rail (60) corresponding to the width of the lower guide groove (8, 9), and the rail (60) has bolts that can be inserted through the slot (3) of the plate (1) and the slot (51) of the extension rail (50) or only through the slot (51) of the extension rail (50) and locked to the latter, and the rail (60) is connected to the plate (1) and, by means of a spacer (68), to the extension rail (50), the thickness of the spacer (68) corresponding to the thickness of the plate (1).

11. Radius-milling fixture per claim 1, characterized in that a ruler is provided parallel with the slot (3, 51).

12. Radius-milling fixture per claim 6, characterized in that the extension rail (50) has a borehole on its underside and at those places where the screws are led through it (64, 53; 65, 52), whose width corresponds to the width of the upper groove (6, 7).

13. Radius-milling fixture according to claim 1, further characterized in that the fastening means (30–35) is slidable up to the borehole (12).

* * * * *